United States Patent
Goodman et al.

(10) Patent No.: US 10,529,468 B2
(45) Date of Patent: Jan. 7, 2020

(54) ENHANCED DATA AND POWER WIRELINE

(71) Applicant: Halliburton Energy Services, Inc., Houston, TX (US)

(72) Inventors: George D. Goodman, Houston, TX (US); Wei Zhang, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/767,970

(22) PCT Filed: Nov. 12, 2015

(86) PCT No.: PCT/US2015/060286
§ 371 (c)(1),
(2) Date: Apr. 12, 2018

(87) PCT Pub. No.: WO2017/082904
PCT Pub. Date: May 18, 2017

(65) Prior Publication Data
US 2018/0308606 A1    Oct. 25, 2018

(51) Int. Cl.
*G02B 6/44* (2006.01)
*H01B 11/22* (2006.01)
*H01B 9/00* (2006.01)
*H01B 7/04* (2006.01)

(52) U.S. Cl.
CPC ........... *H01B 11/22* (2013.01); *G02B 6/4413* (2013.01); *H01B 7/04* (2013.01); *H01B 9/005* (2013.01)

(58) Field of Classification Search
None
See application file for complete search history.

(56) References Cited

U.S. PATENT DOCUMENTS

| | | | |
|---|---|---|---|
| 4,156,104 A | 5/1979 | Mondello | |
| 4,239,336 A | 12/1980 | Parfree et al. | |
| 4,375,313 A * | 3/1983 | Anderson | G02B 6/4413 174/109 |
| 4,523,804 A | 6/1985 | Thompson | |

(Continued)

FOREIGN PATENT DOCUMENTS

| | | |
|---|---|---|
| EP | 1065674 B1 | 1/2001 |
| GB | 2368921 | 7/2002 |

(Continued)

OTHER PUBLICATIONS

PCT International Search Report and Written Opinion dated Aug. 8, 2016, issued in corresponding application No. PCT/US2015/060286 filed on Nov. 12, 2015, 15 pgs.

(Continued)

*Primary Examiner* — Michael Stahl
(74) *Attorney, Agent, or Firm* — Chamberlain Hrdlicka (57) ABSTRACT

A cable including a fiber optic core configured to transmit data, a core conductor configured to transmit power and located concentrically around the fiber optic core, and a concentric conductor configured to transmit power and located concentrically around the core conductor and the fiber optic core. The cable also includes a dielectric layer located between the core conductor and the concentric conductor and configured to electrically isolate the core conductor from the concentric conductor.

18 Claims, 4 Drawing Sheets

(56) References Cited

U.S. PATENT DOCUMENTS

| | | | |
|---|---|---|---|
| 4,577,925 A | 3/1986 | Winter et al. | |
| 4,756,596 A * | 7/1988 | Ona | G02B 6/4407 385/110 |
| 4,896,939 A * | 1/1990 | O'Brien | G02B 6/3816 174/110 R |
| 4,952,012 A | 8/1990 | Stamnitz | |
| 5,150,442 A * | 9/1992 | Desmons | G02B 6/4416 174/103 |
| 5,495,547 A | 2/1996 | Rafie et al. | |
| 5,539,851 A * | 7/1996 | Taylor | G02B 6/4416 174/102 R |
| 5,557,698 A * | 9/1996 | Gareis | G02B 6/4416 385/100 |
| 6,049,647 A | 4/2000 | Register et al. | |
| 6,195,487 B1 | 2/2001 | Anderson et al. | |
| 7,302,143 B2 | 11/2007 | Ginocchio et al. | |
| 7,324,730 B2 | 1/2008 | Varkey et al. | |
| 7,381,900 B2 | 6/2008 | Bremnes et al. | |
| 7,763,802 B2 | 7/2010 | Varkey et al. | |
| 7,860,362 B2 | 12/2010 | Varkey et al. | |
| 7,912,333 B2 | 3/2011 | Varkey et al. | |
| 7,920,762 B2 | 4/2011 | Silverbrook et al. | |
| 7,920,765 B2 | 4/2011 | Varkey | |
| 8,227,697 B2 | 7/2012 | Varkey et al. | |
| 8,486,527 B2 | 7/2013 | Hager et al. | |
| 8,699,839 B2 | 4/2014 | Batlle i Ferrer et al. | |
| 8,842,954 B2 | 9/2014 | Burris et al. | |
| 8,879,876 B2 | 11/2014 | Rinzler et al. | |
| 8,929,701 B2 | 1/2015 | Lowell et al. | |
| 8,942,527 B2 | 1/2015 | Homa et al. | |
| 8,957,312 B2 | 2/2015 | McCullough et al. | |
| 2002/0027012 A1 | 3/2002 | Bonicel | |
| 2002/0097966 A1 * | 7/2002 | Zelesnik | F16L 9/19 385/100 |
| 2003/0103742 A1 * | 6/2003 | Auvray | G02B 6/4436 385/109 |
| 2003/0169179 A1 | 9/2003 | James, II | |
| 2006/0018611 A1 * | 1/2006 | Maida, Jr. | G02B 6/4492 385/102 |
| 2007/0188344 A1 | 8/2007 | Hache et al. | |
| 2007/0189679 A1 * | 8/2007 | Stahulak | G02B 6/4416 385/101 |
| 2010/0202741 A1 | 8/2010 | Ryan et al. | |
| 2014/0367121 A1 * | 12/2014 | Varkey | E21B 47/123 166/385 |
| 2015/0170799 A1 | 6/2015 | Varkey et al. | |
| 2017/0271045 A1 * | 9/2017 | Goodman | H01B 11/1847 |

FOREIGN PATENT DOCUMENTS

| | | |
|---|---|---|
| JP | 2004214031 A | 7/2004 |
| WO | 2006054092 A1 | 5/2006 |

OTHER PUBLICATIONS

AFL Armored Loose Tube Cable, "Double-Jacket Single-Armor OSP Loose Tube (LE Series SADJ)", FAFL, Fiber Optic Cable, 2015, pp. 1.

* cited by examiner

ENHANCED DATA AND POWER WIRELINE

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Downhole oil and gas operations often utilize electronic tools, such as various types of wireline tools, which require power and communication capabilities. A wireline tool is typically located downhole in a borehole and suspended via a wireline cable which provides power and allows communication to be sent to and received by the tool. The downhole environment presents many limitations. One such limitation is related to form factor. As boreholes may have limited space, the tools must be suitably sized to fit within the borehole. This also limits the size of the wireline cable. Limiting the size of the wireline cable in turn limits power delivery and data transfer speeds.

As downhole tools are able to perform more functions and generate higher resolution data, associated hardware is necessary to be able to support the increase in data. This creates a demand for improved power delivery and faster data transfer means while remaining within the physical constraints and requirements of the downhole environment.

BRIEF DESCRIPTION OF THE DRAWINGS

For a detailed description of the embodiments of the invention, reference will now be made to the accompanying drawings in which.

DETAILED DESCRIPTION

The present disclosure presents a cable with a fiber optic cable and a high voltage power bus, which better utilize the limited space available for power and data transfer, rather than grouped stranded wires found in conventional cables or other types of data and power cables. Traditional wirelines operate between 90V and 2,000V, while high voltage may be considered greater than 2,000V. The wireline of the present disclosure supports uphole supply voltages as high as 180,000V to allow greater power levels to be delivered to downhole tools at greater depths. For purposes of this disclosure, the following embodiments describe a wireline cable for use downhole. However, it should be understood that the cable in accordance with one or more embodiments may be used in any cable operation such as a wireline operation, slickline operation, logging operation, coiled tubing operation, or any other operation known in the art.

Figure 1:
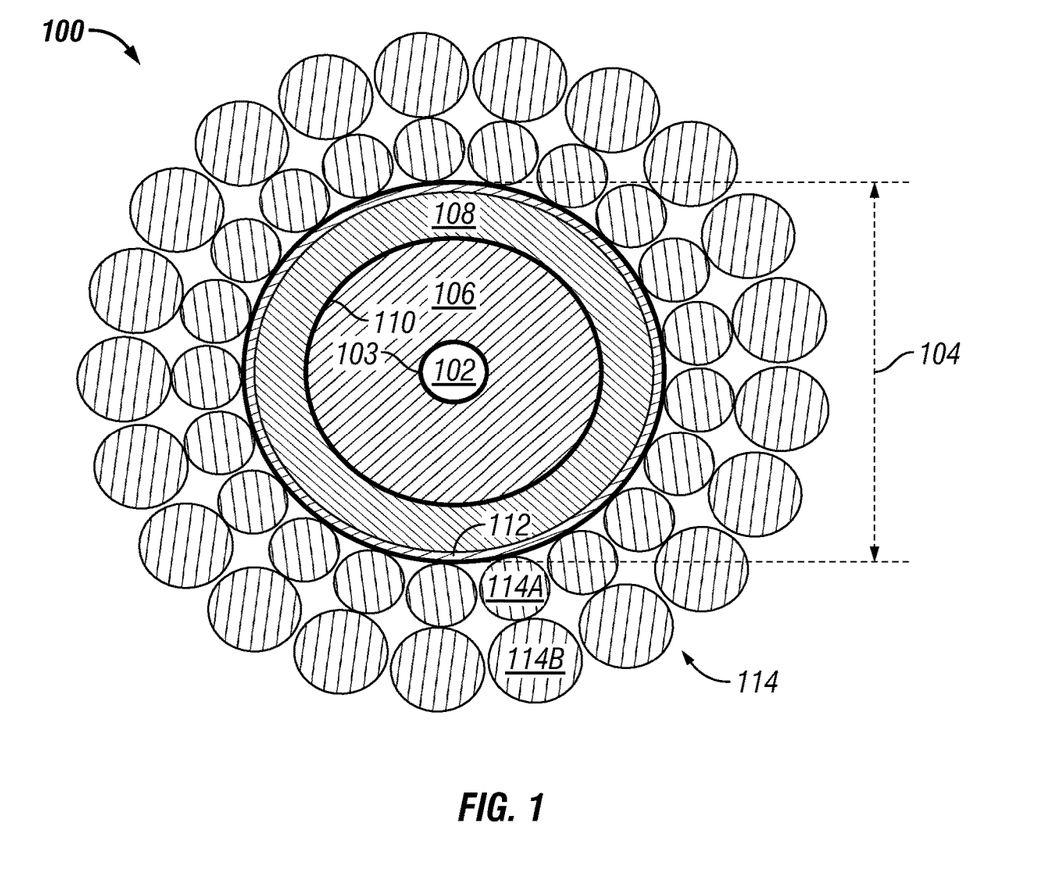
FIG. 1 depicts a schematic cross-sectional view of a cable in accordance with one or more embodiments.

FIG. 1 depicts a schematic cross-sectional view of a wireline cable 100 in accordance with one or more embodiments. As shown, the wireline cable 100 includes a fiber optic core 102 located generally at the center of the cable 100. The fiber optic core 102 may include a single fiber optic cable or multiple fiber optic cables bundled together. The fiber optic core 102 is configured to transmit data from one end of the cable 100 to another. In one or more embodiments, the fiber optic core 102 may include one fiber optic cable used to transmit data, while additional fiber optic cables may be provided within the fiber optic core 102 for redundancy and/or to enhance data rates.

As shown, the fiber optic core 102 only makes up a portion of the wireline cable 100 diameter 104. For example, the wireline cable 100 diameter 104 may be about 0.5", while the fiber optic core 102 may have a diameter of 0.06". A majority of the remaining portion of the cable 100 surrounding the fiber optic core 102 may include a high voltage power bus including a core conductor 106 and a concentric conductor 108. To provide power downhole, the high voltage power bus may be configured to use Alternating Current (AC), Direct Current (DC), or a combination of AC and DC. To provide maximum power delivery downhole, a single high voltage power bus and DC power may be utilized, as shown. However, it should be understood that multiple high voltage power buses and thus, multiple conductors, may be used without departing from the scope of the present disclosure.

In one or more embodiments, the fiber optic core 102 may be wrapped with an isolation layer 103 configured to isolate the fiber optic core 102 from the core conductor 106. The isolation layer 103 around the fiber optic core 102 may be about 0.005" in thickness and may include any suitable type of protective isolation material. For example, the isolation layer 103 may include Polyethylene film, glass, Teflon™, and/or other material with similar properties and configured to protect the fiber optic core 102. It should be understood that selection of the material for the isolation layer 103 may also depend on the mechanical robustness, chemical resistance, coefficient of friction, and temperature rating of the material with respect to that required for the application.

In one or more embodiments, the core conductor 106 may be a stranded conductor including a plurality of wire strands twisted together to form the conductor 106. In some embodiments, the core conductor 106 and the isolation layer 103 may be provided integrally as an insulated stranded conductor. A stranded conductor as the core conductor 106 provides robust mechanical properties, tolerating bending, stretching, and relaxing over numerous well-run cycles. The wire gauge of the conductor 106, the insulation material and thickness of the isolation layer 103 may be selected depending on the desired conduction drop and dielectric strength provided between the core conductor 106 and the concentric conductor 108 in the cable 100.

The core conductor 106 and the concentric conductor 108 may be configured to transmit power and a cross-sectional area of the core conductor 106 and the concentric conductor 108 may be about the same in order to minimize electrical resistance of the cable 100. In one or more embodiments, the core conductor 106 and the concentric conductor 108 may be fabricated from a copper material or any other electrically conductive material. Also, the core conductor 106 may be a positive conductor formed over the nonconductive fiber optic core 102, while the concentric conductor 108 may be a return conductor connected to ground at an end (e.g., uphole end) of the cable 100.

In one or more embodiments, a dielectric layer 110 located between the core conductor 106 and the concentric conductor 108 and may electrically isolate the core conductor 106 from the concentric conductor 108. The dielectric layer 110 may include a high voltage dielectric separator formed from a high dielectric strength enamel material such as an enamel coating for insulating solid copper wire commonly used for magnetic windings. In one or more embodiments, the dielectric layer may include at least one of a thermoplastic resin (e.g., Formvar), Polyurethane, Polyurethane Nylon, Polyethylene terephthalate (e.g., Dacron), Polyester-imide, Polyester Nylon, Polytetrafluoroethylene (PTFE), and Polyimide.

For example, a Polyimide resin may be selected that provides a 240° C. operating temperature rating with 2,000 volts per Mil dielectric strength, where one Mil is about 0.001" of thickness. Polyimide is also unaffected by prolonged exposure to solvents and chemicals typically found in the oil and gas well environment. Other materials may be used to form the dielectric layer 110 and may be configured to operate in temperatures ranging from 105° C. to 240° C. and may be selected based on the ability for coated wires to bend or flex without cracking or loss of good insulating properties.

The concentric conductor 108 may be wrapped with an insulation layer 112 forming the outer circumference of the cable 100. The insulation layer 112 may be configured to insulate the cable 100 and its elements from the surrounding environment. In one or more embodiments, the insulation layer 112 may be about 0.02" in thickness and may include any suitable protective isolation material. For example, the insulation layer 112 may include Polyethylene film, glass, Teflon, and/or other material with similar properties and configured to protect the cable 100. It should be understood that selection of the material for the insulation layer 112 may also depend on the mechanical robustness, chemical resistance, coefficient of friction, and temperature rating of the material with respect to that required for the application.

As shown, the wireline cable 100 includes one or more armor layers 114 located around the insulation layer 112, such as an inner armor steel wire 114A and an outer armor steel wire 114B. The insulation layer 112 protects the conductor 108 from abrasion caused by the one or more armor layers 114. While the insulation layer 112 may comprise an insulating material, it should be understood that the insulation layer 112 may comprise a conductive material. The armor layer 114 may be located about the concentric conductor 108 and may be configured to support the load of the cable 100. The armor layer 114 may include steel wire, carbon fiber, and/or one or more composite materials to protect and support the cable 100. In one or more embodiments, the armor layer 114 may be used as a conductor either replacing the concentric conductor as a return conductor or connected with the concentric conductor to reduce a resistance of the cable 100.

The example embodiment of FIG. 1 and discussed above represents one possible implementation of the present disclosure and does not limit the scope of the disclosure. The wireline cable described above is suitable for many existing wireline systems. However, the wireline cable with concentric conductors disclosed herein can have any number of fiber optic cables, conductors and insulation layers as well as other layers and materials suitable for specific implementations of the presently disclosed techniques.

Figure 2:
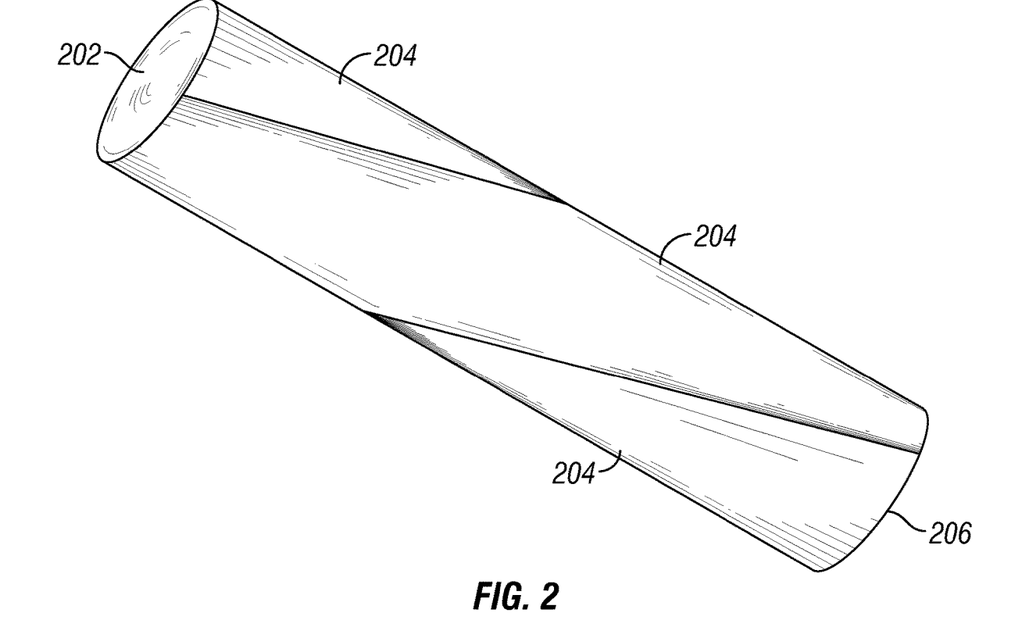
FIG. 2 depicts a perspective view of the forming of a conductor around an underlying cable in accordance with one or more embodiments.

FIG. 2 is a perspective view of a conductor 206 (e.g., core conductor 106, concentric conductor 108 as shown in FIG. 1) formed around an underlying cable 202 of the wireline cable 100 in accordance with one or more embodiments. The underlying cable 202 may be any conductor, insulating layer, fiber optic cable, dielectric, or a combination of the foregoing, that forms at least a portion of the wireline cable 100.

In one or more embodiments, the conductor 206 may be formed by helically wrapping one or more conductive strips 204 around the underlying cable 202. The underlying cable 202 may be a fiber optic cable (e.g., fiber optic core 102 of FIG. 1), a conductor (e.g., core conductor 106, concentric conductor 108 of FIG. 1), a dielectric (e.g., dielectric layer 110 of FIG. 1), an insulating layer (e.g., insulation layer 112 of FIG. 1), or any combination of the foregoing. The conductive strips 204 may be fabricated from copper or any other conductive material. In some embodiments, the conductor 206 is formed from one or more conductive strips 204 helically wound side by side around the underlying cable 202. In this example, three conductive strips 204 having a width spanning 120 degrees, or one-third, of the intended conductor circumference are used. In one such embodiment, a single conductive strip 204 may be wound around the underlying cable 202 along at least a portion of a length of the conductor 206. In another embodiment, the conductive strips 204 are wound with an approximate pitch of one turn every two feet along the length of the cable. However, the number of strips, their width, and the winding pitch may be selected so as to adequately support the load bearing stretch and contraction as well as bending of the cable 100 during use.

In other embodiments, the conductor 206 can be made from any number of conductive strips 204 formed in various configurations around the underlying cable 202. Different conductors (e.g., conductors 106 and 108 as shown in FIG. 1) within the cable 100 can be formed differently. For example, a conductor with a larger diameter, such as concentric conductor 108, can be made from wider conductive strips 204 or a larger number of conductive strips 204 than a conductor with a smaller diameter, such as conductor 106. In one or more embodiments, concentric conductor 108 may be formed around core conductor 106 by wrapping one or more conductive strips 204 around the core conductor 106.

Figure 3:
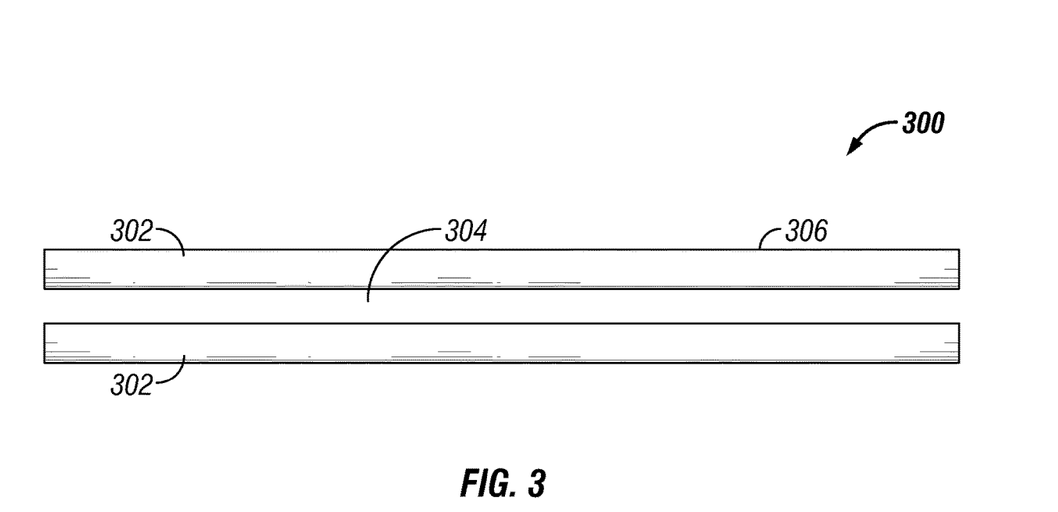
FIG. 3 depicts a cross-sectional view of a conductor-dielectric strip in accordance with one or more embodiments.

In one or more embodiments, the core conductor 106 and the concentric conductor 108 and a dielectric layer 110 may be formed simultaneously. FIG. 3 depicts a cross-sectional view of a preformed conductor-dielectric strip 300 in accordance with one or more embodiments. The conductor-dielectric strip 300 includes two conductive strips 302 with a layer of enamel dielectric coating 304 formed in between and around the two conductive strips 302. In one example, two conductive strips 302 are spaced apart by approximately 4 Mil and the gap is filled with enamel coating 304. The enamel coating 304 may be formed between the conductive strips 302 through a dipping and degassing process in which the conductive strips 302 are dipped in enamel, removing substantially all voids between the conductors and filling them with enamel 304. In some instances, the conductive strips 304 are 10 Mil thick and the enamel coating 304 disposed therebetween is 4 Mil thick. The dipping process may also leave, for example, approximately 0.5 Mil of protective enamel coating on exterior surfaces 306 of the conductive strips 302. However, in other embodiments, the conductive strips 302 and the enamel coating 304 may be formed to other thicknesses suitable for the application. In one or more embodiments, the core conductor 106 and the concentric conductor 108 and a dielectric layer 110 may be formed simultaneously by wrapping the preformed conductor-dielectric strip 300 around an underlying cable (such as underlying cable 202 in FIG. 2).

Figure 4:
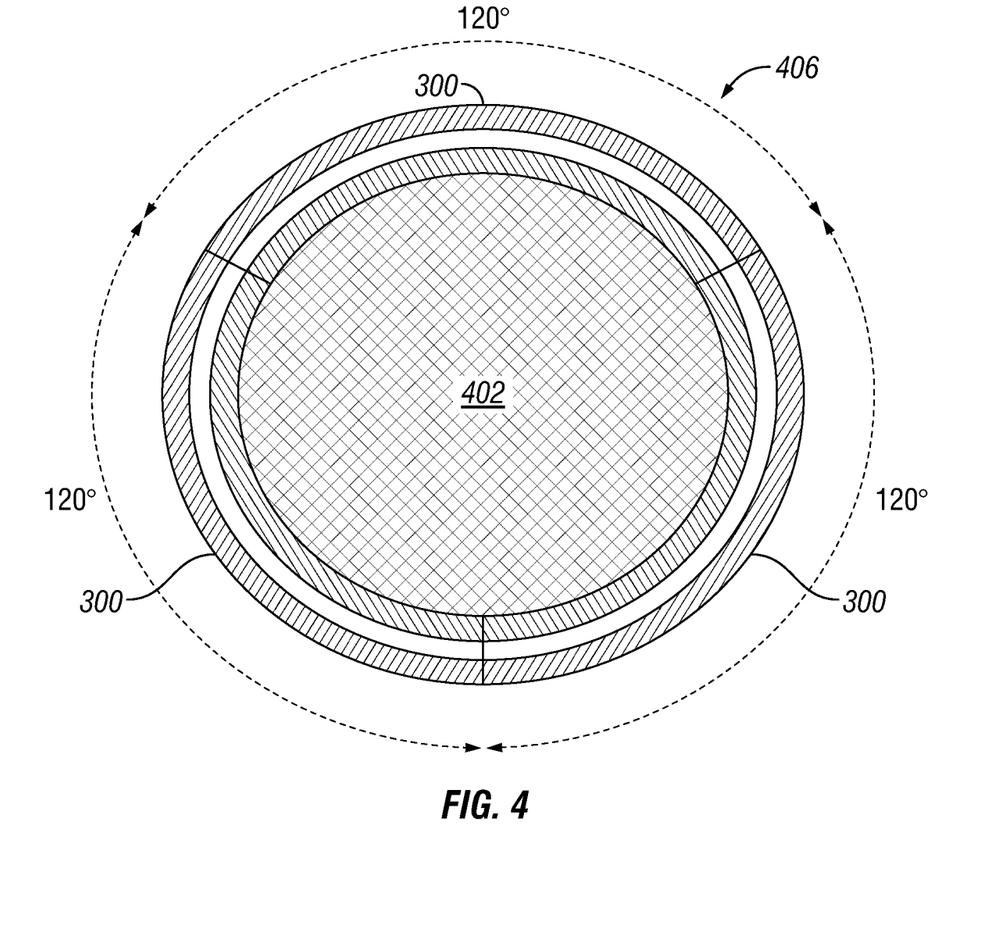
FIG. 4 is a cross-sectional view of three conductor-dielectric strips wrapped helically side by side around an underlying cable in accordance with one or more embodiments.

FIG. 4 depicts a cross-sectional view of three conductor-dielectric strips 300 wrapped helically side by side around an underlying cable 402, forming a conductor 406 (e.g., core conductor 106 or concentric conductor 108 as shown in FIG. 1). In such an embodiment, each conductor-dielectric strip 300 covers 120 degrees of the intended arc length of the circumference. More or less than three conductor-dielectric strips 300 can be wrapped side by side. Thus, the conductor 406 may be formed by helically wrapping one or more conductor-dielectric strips 300 around an underlying cable 402. One or more additional conductive strips (such as conductive strips 204 in FIG. 2) may be wrapped around an underlying cable 402 to form the conductor 406.

In all of the embodiments, the configuration of the conductors, fiber optic core, the dielectric layer, and the insulating layers in the wireline cable as well as the helical formation of the conductor and insulating layers allows maximum usage of the space within a cross-section of the cable as the space can be fully dedicated to a high voltage power bus surrounding a fiber optic core conductor with little to no wasted space. Additionally, the concentric orientation of the conductors about a fiber optic core allows for a greater overall cross-section for each conductor that enables increased transmission speeds and higher power transfer. Furthermore, the electric flux density is uniform over the full circumference for the conductors due to the radial symmetry of the cable. The helical construction of the conductive and insulation layers allows the cable to bend and stretch while maintaining the mechanical and electrical integrity of the cable.

Figure 5:
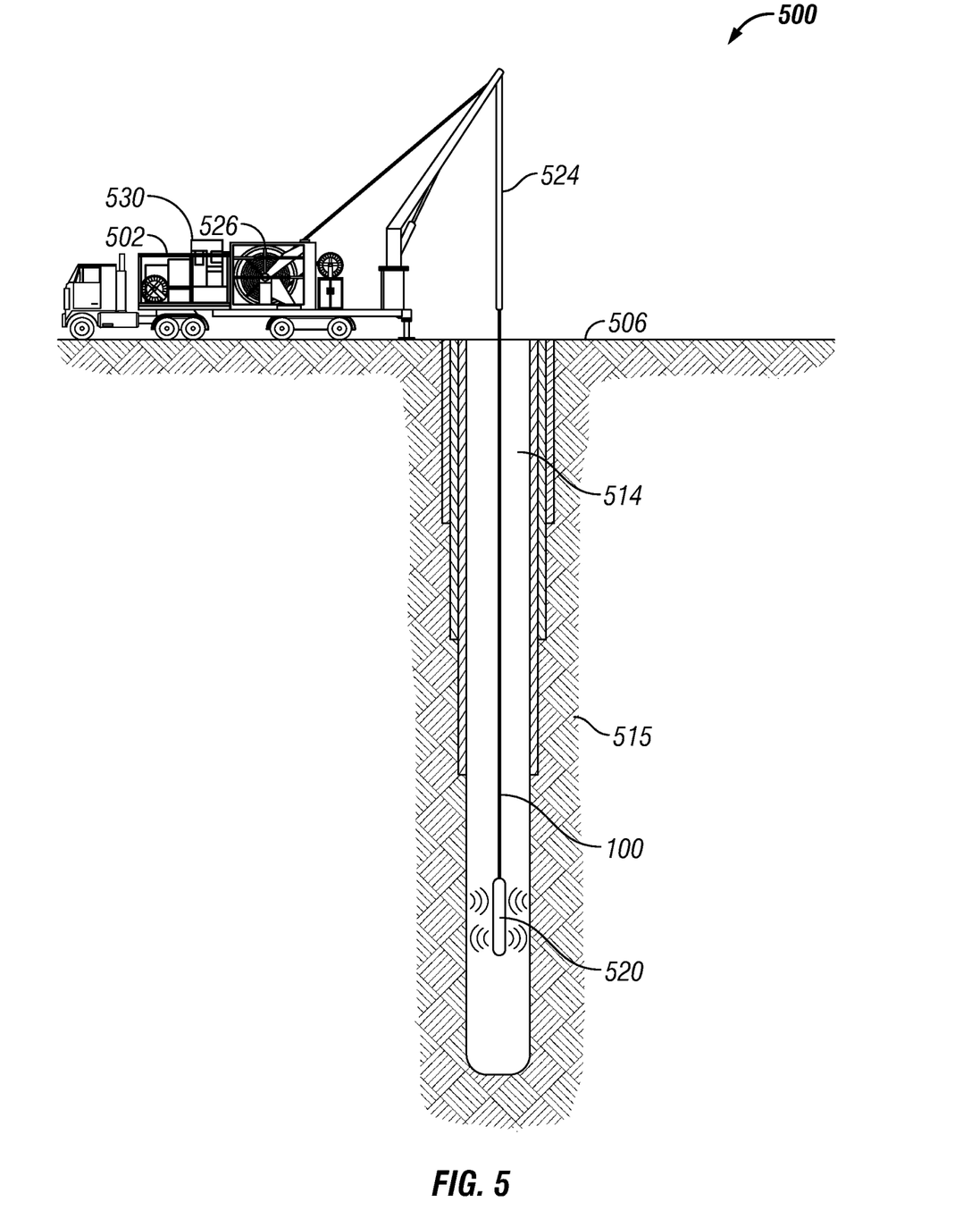
FIG. 5 depicts an example system with a cable and logging tool in accordance with one or more embodiments.

FIG. 5 depicts a logging system 500 with a wireline cable 100 and logging tool 520. The logging tool 520 is configured to obtain data of a wellbore 514 and surround formation 515. In one or more embodiments, the wireline cable 100 is suspended from a wireline truck 502 parked at the well site 506. The wireline truck 502 may include a wireline spool 526 which conveys the wireline cable 100 into the wellbore 514. The wireline truck 502 may also include a hoist 524 which suspends the wireline cable 100 and logging tool 520 in the wellbore 514. In one or more embodiments, the concentric wireline cable 100 and logging tool 520 may be suspended by various other well site structures such as a rig. In other embodiments, the logging tool 520 may be a pipe conveyed logging tool, which allows logging of horizontal well sections.

In one or more embodiments, the logging tool 520 is configured to emit signals in the wellbore 514 through the formation 515. The logging tool 520 then detects the returning data signal. The returning data signal is altered from the original signal based on the mechanical properties of the formation 515, such as compressional velocity, shear velocity, and the like. Thus, the data signal carries such information and can be processed to obtain the formation properties.

The concentric wireline cable 100 is coupled to a control system 530 which may be located on the wireline truck 502. The control system 530 provides power and instructions to the logging tool 520 and receives data from the logging tool 520, with the concentric wireline cable 100 enabling communication therebetween. In some embodiments, the control system 530 is located remotely from the wellsite 506.

In addition to the embodiments described above, many examples of specific combinations are within the scope of the disclosure, some of which are detailed below:

Example 1

A cable including a fiber optic core configured to transmit data, a core conductor configured to transmit power and located concentrically around the fiber optic core, and a concentric conductor configured to transmit power and located concentrically around the core conductor and the fiber optic core, and
a dielectric layer located between the core conductor and the concentric conductor and configured to electrically isolate the core conductor from the concentric conductor Example 2

The cable of Example 1, in which the fiber optic core includes multiple fiber optic cables configured to transmit data.

Example 3

The cable of Example 1, in which the dielectric layer include a high voltage dielectric separator.

Example 4

The cable of Example 1, in which a cross-sectional surface area of the core conductor is substantially the same as a cross-sectional surface area of the concentric conductor.

Example 5

The cable of Example 1, further including an isolation layer located between the fiber optic core and the core conductor, the isolation layer configured to electrically the fiber optic core from the core conductor.

Example 6

The cable of Example 5, in which the isolation layer includes at least one of polyethylene film, glass, and Teflon.

Example 7

The cable of Example 1, further including a load bearing armor wire located around the concentric conductor.

Example 8

The cable of Example 7, in which the load bearing armor wire includes carbon fiber.

Example 9

The cable of Example 1, in which the core conductor includes one or more conductive strips wound around the fiber optic core.

Example 10

The cable of Example 1, in which the concentric conductor includes one or more conductive strips wound around the core conductor.

Example 11

The cable of Example 1, in which the dielectric layer includes a Polyimide resin.

Example 12

A method of manufacturing a cable, including providing an insulated fiber optic core, helically wrapping a conductive strip around the insulated fiber optic core, forming a core conductor from the helically wrapped conductive strip, helically wrapping a dielectric strip around the core conductor, and forming a dielectric layer from the helically wrapped dielectric strip.

Example 13

The method of Example 12, further including helically wrapping a concentric conductive strip around the dielectric layer, and forming a concentric conductor from the helically concentric conductive strip.

Example 14

The method of Example 12, further including helically wrapping two or more conductive strips around insulated fiber optic core.

Example 15

The method of Example 13, further including helically wrapping two or more concentric conductive strips around the dielectric layer.

Example 16

The method of Example 13, in which the dielectric strip is preformed between the conductive strip and the concentric conductive strip.

Example 17

The method of Example 17, further including wrapping the helically wrapped conductive strip concurrently with the concentric conductive strip.

Example 18

A cable system including a control system, a downhole tool, and a cable configured to couple the downhole tool and the control system, the cable including a fiber optic core including a fiber optic cable configured to transmit data, a core conductor configured to transmit power, the core conductor located concentrically around the fiber optic core, a concentric conductor configured to transmit power, the concentric conductor located concentrically around the core conductor and the fiber optic core, and a dielectric layer located between the core conductor and the concentric conductor and configured to electrically isolate the core conductor from the concentric core.

Example 19

The cable system of Example 18, in which the dielectric layer includes at least one of Formvar, Polyurethane, Polyurethane Nylon, Polyethylene Terephthalate, Polyesterimide, Polyester Nylon, Polytetrafluoroethylene, and Polyimide.

Example 20

The cable system of Example 18, in which at least one of the core conductor and the concentric conductor is formed from at least one helically wrapped conductive strip.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A cable comprising:
a fiber optic core configured to transmit data;
a core conductor configured to transmit power and located concentrically around the fiber optic core;
a concentric conductor configured to transmit power and located concentrically around the core conductor and the fiber optic core, wherein a cross-sectional surface area of the core conductor that is perpendicular to a longitudinal axis of the cable is the same as a cross-sectional surface area of the concentric conductor that is perpendicular to the longitudinal axis of the cable; and
a dielectric layer located between the core conductor and the concentric conductor and configured to electrically isolate the core conductor from the concentric conductor.

2. The cable of claim 1, wherein the fiber optic core comprises multiple fiber optic cables configured to transmit data.

3. The cable of claim 1, wherein the dielectric layer comprises a high voltage dielectric separator.

4. The cable of claim 1, further comprising an isolation layer located between the fiber optic core and the core conductor, the isolation layer configured to separate the fiber optic core from the core conductor.

5. The cable of claim 4, wherein the isolation layer comprises at least one of polyethylene film or glass.

6. The cable of claim 1, further comprising a load bearing armor wire located around the concentric conductor.

7. The cable of claim 6, wherein the load bearing armor wire comprises carbon fiber.

8. The cable of claim 1, wherein the core conductor comprises one or more conductive strips wound around the fiber optic core.

9. The cable of claim 1, wherein the concentric conductor comprises one or more conductive strips wound around the core conductor.

10. The cable of claim 1, wherein the dielectric layer comprises a Polyimide resin.

11. A method of manufacturing a cable, comprising:
providing an insulated fiber optic core;
helically wrapping a conductive strip around the insulated fiber optic core;
forming a core conductor from the helically wrapped conductive strip;
helically wrapping a dielectric strip around the core conductor;
forming a dielectric layer from the helically wrapped dielectric strip;
helically wrapping a concentric conductive strip around the dielectric layer; and
forming a concentric conductor from the helically concentric conductive strip, wherein a cross-sectional surface area of the core conductor that is perpendicular to a longitudinal axis of the cable is the same as a cross-sectional surface area of the concentric conductor that is perpendicular to the longitudinal axis of the cable.

12. The method of claim 11, further comprising helically wrapping two or more conductive strips around the insulated fiber optic core.

13. The method of claim 11, further comprising helically wrapping two or more concentric conductive strips around the dielectric layer.

14. The method of claim 11, wherein the dielectric strip is preformed between the conductive strip and the concentric conductive strip.

15. The method of claim 11, further comprising wrapping the helically wrapped conductive strip concurrently with the concentric conductive strip.

16. A cable system comprising:
a control system;
a downhole tool; and
a cable configured to couple the downhole tool and the control system, the cable comprising:
a fiber optic core configured to transmit data;
a core conductor configured to transmit power and located concentrically around the fiber optic core;
a concentric conductor configured to transmit power and located concentrically around the core conductor and the fiber optic core, wherein a cross-sectional surface area of the core conductor that is perpendicular to a longitudinal axis of the cable is the same as a cross-sectional surface area of the concentric conductor that is perpendicular to the longitudinal axis of the cable; and
a dielectric layer located between the core conductor and the concentric conductor and configured to electrically isolate the core conductor from the concentric core.

17. The cable system of claim 16, wherein the dielectric layer comprises at least one of a thermoplastic resin, Polyurethane, Polyurethane Nylon, Polyethylene Terephthalate, Polyester-imide, Polyester Nylon, Polytetrafluoroethylene, or Polyimide.

18. The cable system of claim 16, wherein at least one of the core conductor and the concentric conductor is formed from at least one helically wrapped conductive strip.

* * * * *